(12) United States Patent
Ooya

(10) Patent No.: US 10,632,370 B2
(45) Date of Patent: *Apr. 28, 2020

(54) CONTENT-RELATED INFORMATION DISPLAY SYSTEM

(71) Applicant: KABUSHIKI KAISHA SQUARE ENIX, Tokyo (JP)

(72) Inventor: Kazuhiro Ooya, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,414

(22) Filed: Sep. 26, 2018

(65) Prior Publication Data

US 2019/0022525 A1 Jan. 24, 2019

Related U.S. Application Data

(63) Continuation of application No. 15/288,189, filed on Oct. 7, 2016, now Pat. No. 10,112,108, which is a
(Continued)

(30) Foreign Application Priority Data

Jul. 1, 2011 (JP) .................................. 2011-147655

(51) Int. Cl.
*A63F 13/00* (2014.01)
*A63F 13/26* (2014.01)
(Continued)

(52) U.S. Cl.
CPC .............. *A63F 13/26* (2014.09); *A63F 13/31* (2014.09); *A63F 13/323* (2014.09);
(Continued)

(58) Field of Classification Search
None
See application file for complete search history.

(56) References Cited

U.S. PATENT DOCUMENTS 5,575,717 A 11/1996 Houriet
6,021,185 A 2/2000 Staron
(Continued)

FOREIGN PATENT DOCUMENTS

CN 1296422 5/2001
CN 1794249 6/2006
(Continued)

OTHER PUBLICATIONS

U.S. Appl. No. 13/298,589 to Yoichi Kuroda et al., filed Nov. 17, 2011.
(Continued)

*Primary Examiner* — Paul A D'Agostino
(74) *Attorney, Agent, or Firm* — Greenblum & Bernstein, P.L.C.

(57) ABSTRACT

Systems, methods, and media for displaying content are provided. According to a content-related information display system, a first memory stores content. A first processor outputs a drawing command for displaying the content on a first display, and generates progress status information which is related to a progress status of the content. A second memory stores content-related information which is related to the content. A second processor specifies the content-related information according to the progress status information generated by the first processor. A second display displays the content-related information according to a player input received by the second processor. The first processor generates the progress status information in response to at least one of a predetermined condition being
(Continued)

satisfied in relation to the progress status of the content or a specific operation being received by the first processor.

18 Claims, 6 Drawing Sheets

Related U.S. Application Data continuation of application No. 13/537,336, filed on Jun. 29, 2012, now Pat. No. 9,480,920.

(51) Int. Cl.
    *A63F 13/323*     (2014.01)
    *A63F 13/533*     (2014.01)
    *A63F 13/31*     (2014.01)

(52) U.S. Cl.
    CPC ...... *A63F 13/533* (2014.09); *A63F 2300/303* (2013.01); *A63F 2300/403* (2013.01); *A63F 2300/554* (2013.01); *A63F 2300/5506* (2013.01); *A63F 2300/5546* (2013.01)

(56) References Cited

U.S. PATENT DOCUMENTS

| | | | |
|---|---|---|---|
| 6,283,854 B1* | 9/2001 | Niwa | A63F 13/10 463/7 |
| 6,340,330 B1* | 1/2002 | Oishi | A63F 13/10 463/8 |
| 6,354,940 B1* | 3/2002 | Itou | A63F 13/10 463/8 |
| 6,533,663 B1* | 3/2003 | Iwao | A63F 13/10 463/32 |
| 6,585,599 B1 | 7/2003 | Horigami | |
| 6,755,743 B1* | 6/2004 | Yamashita | A63F 13/005 463/42 |
| 6,764,401 B1* | 7/2004 | Akatsuka | A63F 13/10 463/36 |
| 7,008,322 B1 | 3/2006 | Suzuki et al. | |
| 7,611,409 B2 | 11/2009 | Muir et al. | |
| 7,753,772 B1 | 7/2010 | Walker | |
| 7,955,175 B1 | 6/2011 | Holloway | |
| 8,083,587 B2 | 12/2011 | Okada | |
| 8,430,741 B2 | 4/2013 | Agarwal et al. | |
| 8,469,823 B2 | 6/2013 | Roberts | |
| 2002/0022522 A1 | 2/2002 | Yamada | |
| 2002/0034980 A1 | 3/2002 | Lemmons et al. | |
| 2002/0086730 A1 | 7/2002 | Nakai | |
| 2002/0162120 A1 | 10/2002 | Mitchell | |
| 2003/0144045 A1 | 7/2003 | Fujita | |
| 2004/0092311 A1* | 5/2004 | Weston | A63F 13/10 463/42 |
| 2004/0157654 A1 | 8/2004 | Kataoka et al. | |
| 2004/0198498 A1* | 10/2004 | Yamashita | A63F 13/005 463/43 |
| 2005/0026695 A1 | 2/2005 | Tsuchiyama | |
| 2005/0043097 A1 | 2/2005 | March | |
| 2005/0054402 A1* | 3/2005 | Noguchi | A63F 13/10 463/5 |
| 2006/0046810 A1* | 3/2006 | Tabata | A63F 13/12 463/9 |
| 2006/0068917 A1 | 3/2006 | Snoddy | |
| 2006/0135232 A1 | 6/2006 | Willis | |
| 2006/0281556 A1 | 12/2006 | Solomon | |
| 2007/0265046 A1* | 11/2007 | Sato | A63F 13/10 463/8 |
| 2007/0265047 A1* | 11/2007 | Nomura | A63F 13/00 463/8 |
| 2008/0076569 A1* | 3/2008 | Tabata | A63F 13/12 463/41 |
| 2008/0139308 A1 | 6/2008 | Kamiyama | |
| 2008/0200250 A1* | 8/2008 | Orihara | A63F 13/10 463/31 |
| 2009/0280905 A1* | 11/2009 | Weisman | A63F 13/08 463/40 |
| 2010/0113154 A1* | 5/2010 | Leingang | A63F 13/12 463/40 |
| 2010/0144434 A1* | 6/2010 | Leingang | A63F 13/12 463/35 |
| 2010/0197407 A1 | 8/2010 | Kataoka et al. | |
| 2010/0240455 A1 | 9/2010 | Gagner | |
| 2010/0248823 A1 | 9/2010 | Smith | |
| 2011/0185057 A1 | 7/2011 | Waugaman et al. | |
| 2011/0190061 A1 | 8/2011 | Takeda | |
| 2011/0281566 A1 | 11/2011 | Davis | |
| 2012/0225717 A1 | 9/2012 | Kuroda | |
| 2012/0331112 A1 | 12/2012 | Chatani | |
| 2013/0130777 A1 | 5/2013 | Lemay | |

FOREIGN PATENT DOCUMENTS

| | | |
|---|---|---|
| EP | 2058756 | 5/2009 |
| GB | 2442259 | 4/2008 |
| JP | 7-162818 | 6/1995 |
| JP | 11-196345 | 7/1999 |
| JP | 2002-153667 | 5/2002 |
| JP | 2002-191868 | 7/2002 |
| JP | 2002-366418 | 12/2002 |
| JP | 2004-302231 | 10/2004 |
| JP | 2005-039625 | 2/2005 |
| JP | 2009-536058 | 10/2009 |
| JP | 2011-221967 | 11/2011 |

OTHER PUBLICATIONS

U.S. Appl. No. 13/297,410 to Chikara Saito et al., filed Nov. 16, 2011.
Extended European Search Report from European Patent Office in European Patent Application No. 12174232.4, dated Mar. 20, 2013.
Office Action from Japan Patent Office (JPO) in Japanese Patent Application No. 2011-147655, dated Jul. 30, 2013, along with an English language translation thereof.
Office Action from Japan Patent Office (JPO) in Japanese Patent Application No. 2011-147655, dated Apr. 1, 2014, along with an English language translation thereof.
Official Communication ("Summons to Attend Oral Proceedings") from European Patent Office (EPO) in European Patent Application No. 2174232.4, dated Apr. 1, 2015.
Search Report from State Intellectual Property Office (SIPO) of the Peoples Republic of China in Chinese Patent Application No. 201210216826.2, dated Jan. 29, 2016.

* cited by examiner

FIG. 5a

| OPPONENT CHARACTER ID | OPPONENT CHARACTER NAME | MAXIMUM HP | MAXIMUM MP | OFFENSIVE POWER | DEFENSIVE POWER | SPECIAL ABILITY | CHARACTER DESIGN ID |
|---|---|---|---|---|---|---|---|
| ID1001 | SLIME | 10 | 2 | 7 | 5 | - | ID2001 |
| ID1002 | SKELETON | 50 | 10 | 32 | 10 | PARALYSIS | ID2002 |
| ⋮ | ⋮ | ⋮ | ⋮ | ⋮ | ⋮ | ⋮ | ⋮ |

FIG. 5b

| ITEM ID | ITEM NAME | ITEM TYPE | ITEM EFFECT | ITEM DESIGN ID |
|---|---|---|---|---|
| ID3001 | LONG SWORD | WEAPON | 18 | ID4001 |
| ID3002 | DAGGER KNIFE | WEAPON | 7 | ID4002 |
| ⋮ | ⋮ | ⋮ | ⋮ | ⋮ |

FIG. 5c

| QUEST ID | QUEST NAME | CLEAR CONDITION | RELATED STORY DESCRIPTIVE TEXT ID |
|---|---|---|---|
| ID5001 | DEFEAT CERBERUS | VICTORY TO CERBERUS | ID6001 |
| ID5002 | RECAPTURE OF SWORD OF THE SUN | OBTAIN SWORD OF THE SUN | ID6002 |
| ⋮ | ⋮ | ⋮ | ⋮ |

CONTENT-RELATED INFORMATION DISPLAY SYSTEM

CROSS REFERENCE TO RELATED APPLICATIONS

This is a continuation application of U.S. patent application Ser. No. 15/288,189, filed Oct. 7, 2016, which is a continuation application of U.S. patent application Ser. No. 13/537,336, filed Jun. 29, 2012 and now U.S. Pat. No. 9,480,920, which claims the benefit of Japanese Patent Application No. 2011-147655, filed on Jul. 1, 2011. The entire disclosure of each of the above-identified applications, including the specification, drawings, and claims, is incorporated herein by reference in its entirety.

BACKGROUND OF THE INVENTION

1. Field of the Invention

The present invention relates to a content-related information display system including a content reproduce apparatus such as a game apparatus and a content-related information display device which is connectable to the content reproduce apparatus by a communications line and displays content-related information related to a content being reproduced in the content reproduce apparatus.

2. Description of the Related Art

In the past, attacking guides describing attacking methods of video games have been sold in bookstores or the like. The attacking guides contain useful information that enables a player to get a high score or efficiently clear a final goal of a game when the player plays a video game, and more specifically, information on a detailed map in a virtual space where the player moves, or a status or ability of an opponent character that the player encounters, information on the effect of items or how to obtain items, and the like. If the player has any questions when playing the game, it is common that the player progresses the game while referring to these attacking guides.

By the way, when the player refers to the attacking guide, the player needs to find where desired information exists, while checking a table of contents or an index in the attacking guide. However, in order to find desired information, the player needs to take hands off a game apparatus controller and stop the game. For this reason, it is inefficient in progressing the game, and time and effort are required. Hence, there has been a problem in that the player loses his or her interest in the game.

Also, recently, skilled players have personally summarized attacking methods of games and made them public on the Internet. In order to access such sites and find necessary information, general players need to find desired information by using search functions within sites or clicking links within sites several times. Therefore, as in the case of the attacking guides by books, it is necessary to stop the game, which causes a problem in that the player loses his or her interest in the game.

In this situation, in order to save the effort of purchasing and checking an attacking guide describing an attacking method, software related to an attacking method of a game has been developed to display or reproduce the attacking method according to an operation to a game apparatus (see, for example, JP 2002-153667 A).

However, since the invention described in JP-A No. 2002-153667 checks information associated with an attacking method on a display screen of a game apparatus with which a player is playing, it is necessary to stop the game, check the attacking method, and then resume the game. Therefore, the invention described in JP-A No. 2002-153667 does not solve a problem that it takes time to progress the game.

SUMMARY OF THE INVENTION

The present invention is directed to provide a content-related information display system capable of acquiring related information corresponding to a content being reproduced (for example, information helpful in progressing a game, such as an attacking method) during the reproduction of contents such as a game, without stopping reproducing the content and taking the time and effort.

The present invention relates to a content-related information display system comprising: a content reproduce apparatus including a display device; and a content-related information display device which is connectable to the content reproduce apparatus by a communications line and displays content-related information related to a content being reproduced in the content reproduce apparatus, wherein the content reproduce apparatus includes: a content storage that stores a content to be reproduced; a content reproducer that reproduces the content stored by the content storage; and a reproducing status information transmitter that transmits reproducing status information, which is related to a reproducing status of the content reproduced by the content reproducer, to the content-related information display device, and the content-related information display device includes: a content-related information storage that stores content-related information related to the content; a reproducing status information receiver that receives reproducing status information from the content reproduce apparatus; a content-related information specifier that specifies content-related information to be displayed, according to the reproducing status information received by the reproducing status information receiver; and a content-related information displayer that displays the content-related information, which is specified by the content-related information specifier, on a display screen.

In the present invention, it is preferable that the content reproduce apparatus is a video game apparatus, and the content is a video game program.

For example, in a case that a stationary video game apparatus (hereinafter, a game apparatus) functions as a content reproduce apparatus; a video game as a content is progressed; and a portable terminal having a display screen (for example, a commercially available portable game apparatus or the like) functions as a content-related information display device, information on an attacking method or the like according to a status of a game being progressed in the game apparatus is displayed on the portable terminal. Therefore, since a player can acquire necessary information without taking search time and effort, the game can be smoothly progressed without being stopped.

Also, in case that a DVD player, a CD player, or the like functions as the content reproduce apparatus to reproduce contents such as a movie, an audio, or the like, and a portable terminal function as the content-related information display device, information on a profile of an actor or actress appearing in the movie can be displayed on the portable terminal, or a text of a language lesson can be displayed on the portable terminal. The user can easily acquire information on the movie or the audio being reproduced, regardless of the reproduction of the movie or the like.

In the present invention, it is preferable that the video game apparatus comprises an input device that enables a user to instruct an operation, a video game is progressed by operating a player character by a player's operation instruction to the input device, and the content-related information specifier, furthermore, specifies content-related information to be displayed, according to a status of a player character.

Since the content-related information is specified according to a status of a player character, appropriate information consistent with the status of the player character can be provided to further improve convenience.

In the present invention, it is preferable that the content-related information display device comprises: an input device that enables a user to instruct an operation; a history information storage that stores history information related to the content-related information displayed by the content-related information displayer; a history information displayer that displays the history information, which is stored by the history information storage, on a display screen such that the history information is selectable by a user's operation instruction to the input device; and a selection receptor that receives a selection of the history information displayed by the history information displayer, and the content-related information displayer displays content-related information corresponding to the history information received by the selection receptor.

Once the content-related information is displayed on the content-related information display device, the content-related information remains as a history. Therefore, when needed, the user can select the content-related information displayed in the past, and check details of information.

The present invention also relates to a method for displaying a content-related information performed in a content reproduce apparatus having a display device, and a content-related information display device which is connectable to the content reproduce apparatus by a communications line and displays content-related information related to a content being reproduced in the content reproduce apparatus, wherein the content reproduce apparatus reproduces a content and transmits reproducing status information, which is related to a reproducing status of the reproduced content, to the content-related information display device, and the content-related information display device receives reproducing status information from the content reproduce apparatus, specifies content-related information to be displayed, according to the received reproducing status information, and displays the specified content-related information on a display screen.

BRIEF DESCRIPTION OF THE DRAWINGS

FIGS. 5a to 5c are diagrams illustrating examples of a content-related information table according to an embodiment of the present invention;

DETAILED DESCRIPTION OF EMBODIMENTS

Hereinafter, an embodiment of the present invention will be described. In this embodiment, a case in which the invention is applied to a role playing game (RPG) will be described, but a game genre usable as contents of the invention is not limited thereto. For example, the invention is applicable to an action game, a simulation game, a fighting game, a puzzle game, and other genres of games.

Figure 1:
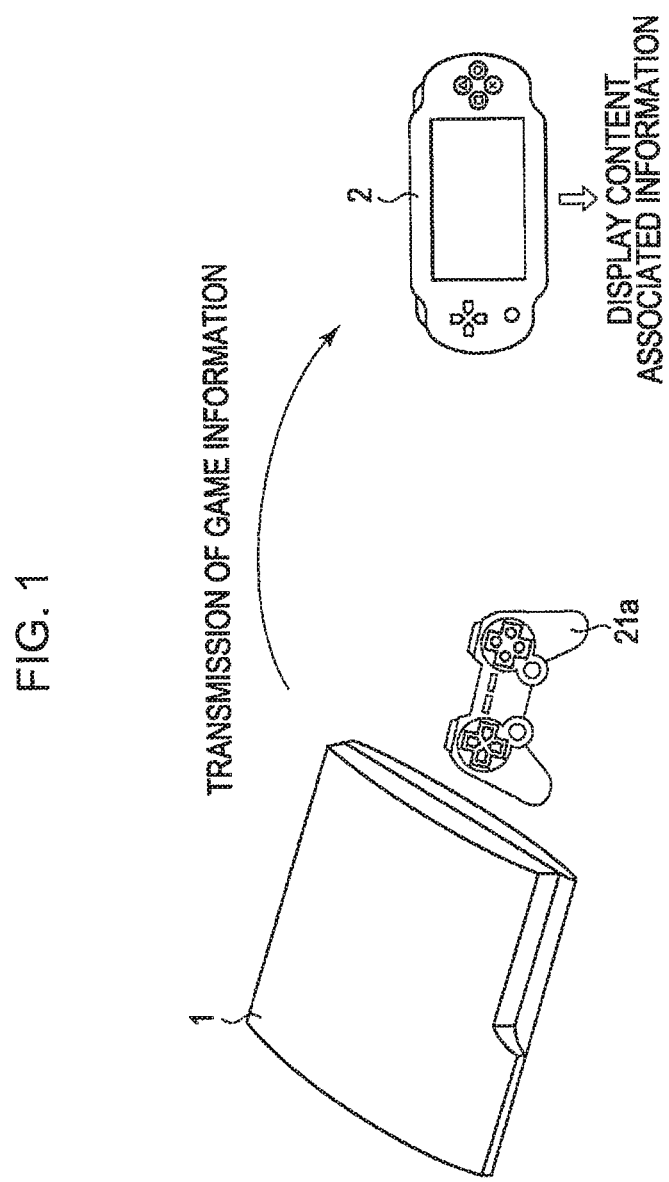
FIG. 1 is a schematic diagram of a content-related information display system according to an embodiment of the present invention.

FIG. 1 is a schematic diagram of a content-related information display system according to an embodiment of the present invention. As illustrated, the content-related information display system includes a stationary game apparatus 1 and a portable game apparatus 2. The game apparatus 1 functions as a content reproduce apparatus, and the portable game apparatus 2 functions as a content-related information display device. The game apparatus 1 may be connected to the portable game apparatus 2 through a communication network, and may be connectable by a wireless communication when needed. Also, in this embodiment, the portable game apparatus 2 is taken as an example of the content-related information display device, but the content-related information display device is not limited thereto as long as a display device is included. The content-related information display device may be a portable phone, a stationary game apparatus, a desktop persona computer, or the like. A portable terminal is preferable in terms of being easy to carry.

A player progresses a game while operating the game apparatus 1. When a predefined predetermined condition is satisfied by the progress of the game, information on a progress status of the game (hereinafter, also refer to as game information) is transmitted from the game apparatus 1 to the portable game apparatus 2. The portable game apparatus 2 receiving the predetermined information specifies content-related information according to the received information, and displays the specified content-related information on a display screen.

For example, when a player character encounters an opponent character, an opponent character ID is transmitted to the portable game apparatus 2 as game information. The portable game apparatus 2 displays information on a status of the opponent character corresponding to the received opponent character ID, information on obtainable items after the completion of a virtual battle, or the like.

Figure 2:
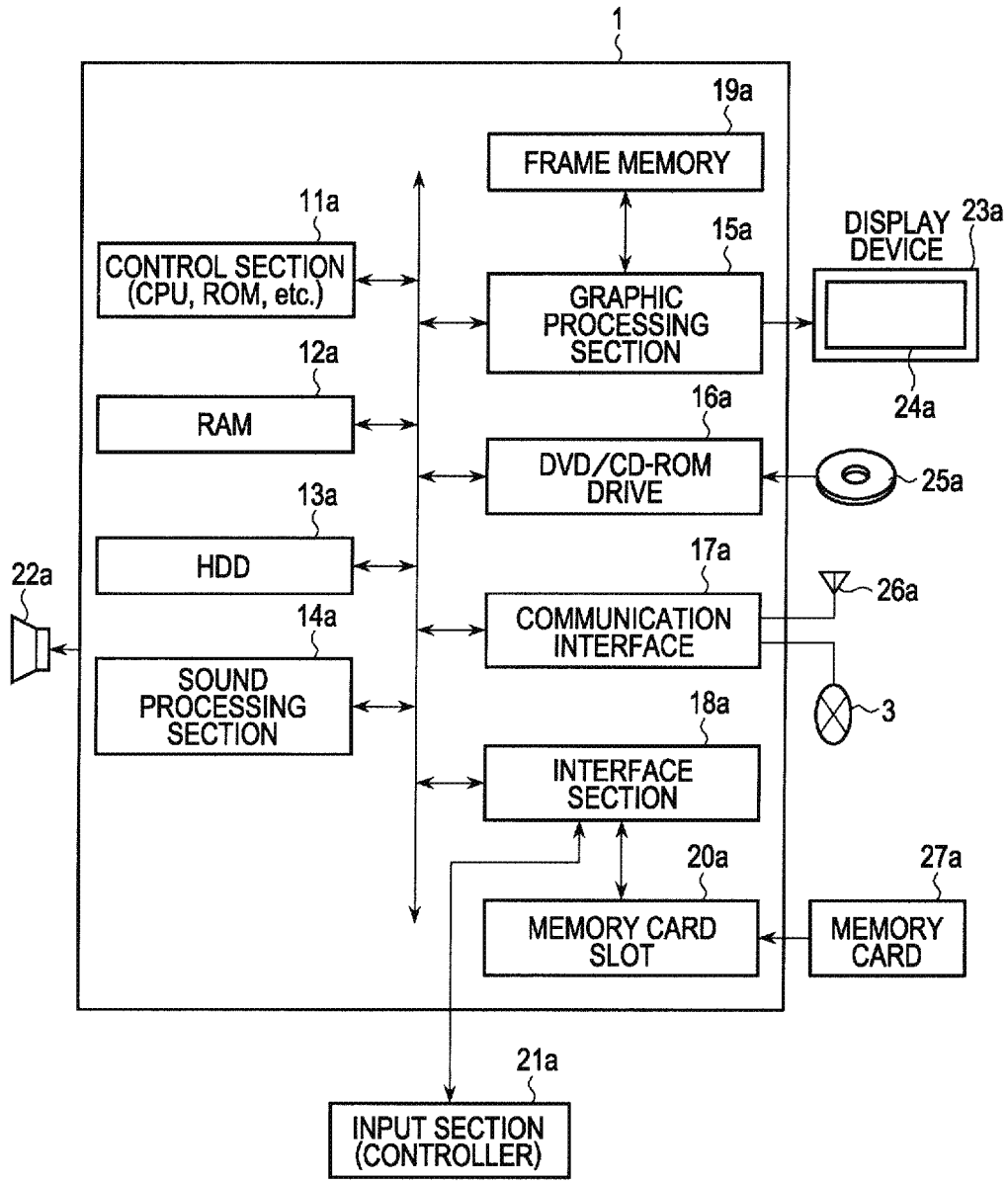
FIG. 2 is a block diagram illustrating a configuration of a stationary game apparatus according to an embodiment of the present invention.

FIG. 2 is a block diagram illustrating a configuration of a stationary game apparatus according to an embodiment of the present invention. The game apparatus 1 includes a control section 11a, a random access memory (RAM) 12a, a hard disk drive (HDD) 13a, a sound processing section 14a, a graphic processing section 15a, a DVD/CD-ROM drive 16a, a communication interface 17a, and an interface section 18a, which are connected to one another by internal buses.

The control section 11a includes a central processing unit (CPU) and a read only memory (ROM). The control section 11a executes a program stored in the HDD 13a or a recording medium 25a, and performs a control of the game apparatus 1. Also, the control section 11*a* includes an internal timer that counts time. The RAM 12*a* is a work area of the control section 11*a*. The HDD 13*a* is a storage area for storing a program or data.

The DVD/CD-ROM drive 16*a* can be mounted with the recording medium 25*a* storing a game program, such as a DVD-ROM or a CD-ROM. The recording medium 25*a* stores a program and data for executing the game. The program and data necessary to progress the game are read from the recording medium 25*a* and loaded on the RAM 12*a* by the DVD/CD-ROM drive 16*a*.

The control section 11*a* reads the program and data necessary to progress the game from the RAM 12*a*, and processes the read program and data. The control section 11*a* processes the program and data loaded on the RAM 12*a* to output a sound output instruction to the sound processing section 14*a* and output a drawing command to the graphic processing section 15*a*.

The sound processing section 14*a* is connected to a sound output device 22*a* that is a speaker. When the control section 11*a* outputs the sound output instruction to the sound processing section 14*a*, the sound processing section 14*a* outputs a sound signal to the sound output device 22*a*.

The graphic processing section 15*a* is connected to a display device 23*a*. The display device 23*a* includes a display screen 24*a*. When the control section 11*a* outputs the drawing command to the graphic processing section 15*a*, the graphic processing section 15*a* deploys an image on a frame memory (frame buffer) 19*a*, and outputs a video signal for displaying the image on the display screen 24*a*. The graphic processing section 15*a* performs a drawing of one image in units of frames. A 1-frame time of an image is, for example, $\frac{1}{30}$ second.

An input section (controller) 21*a* and a memory card slot 20*a* are connected to the interface section 18*a*. Input information from the input section 21*a* by the player is stored in the RAM 12*a*, and the control section 11*a* performs a variety of arithmetic processing based on the input information. Also, according to an instruction from the control section 11*a*, the interface section 18*a* performs processing of storing data about the game progress status, stored in the RAM 12*a*, into a memory card 27*a*, or processing of reading data stored in the memory card 27*a* and transmitting the read data to the RAM 12*a*.

The communication interface 17*a* may be connected to the communication network 3 by wireless or cable. Also, the communication interface 17*a* performs a wireless communication with the portable game apparatus 2 through a communication unit having an antenna 26*a*, and performs a transmission of game information or the like.

Figure 3:
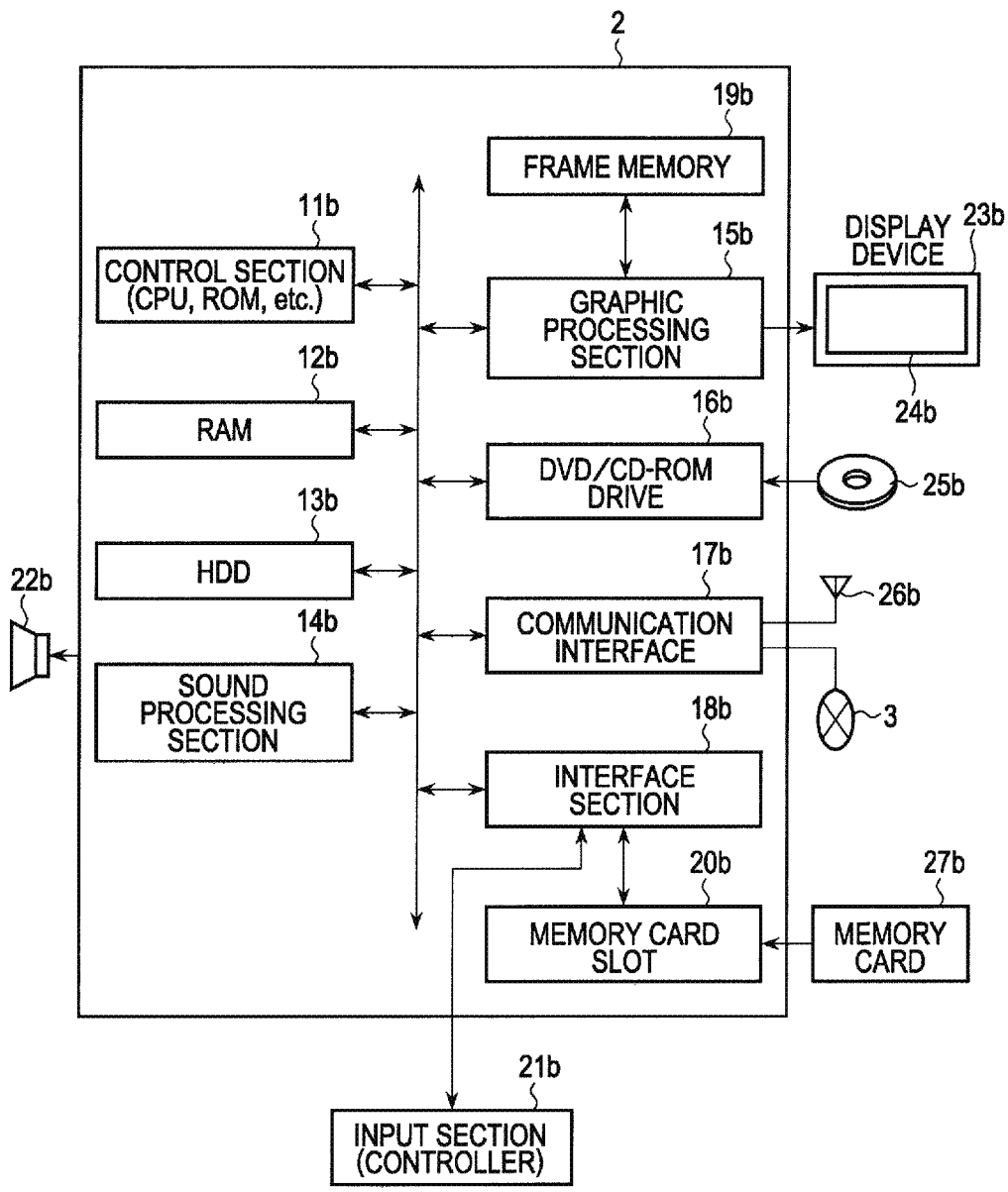
FIG. 3 is a block diagram illustrating a configuration of a portable game apparatus according to an embodiment of the present invention.

FIG. 3 is a block diagram illustrating a configuration of a portable game apparatus according to an embodiment of the present invention. The portable game apparatus 2, basically, has the same configuration and function as the game apparatus 1 illustrated in FIG. 2. The portable game apparatus 2 includes a control section 11*b*, a RAM 12*b*, a hard disk drive (HDD) 13*b*, a sound processing section 14*b*, a graphic processing section 15*b*, a DVD/CD-ROM drive 16*b*, a communication interface 17*b*, and an interface section 18*b*, which are connected to one another by internal buses. The control section 11*b* includes a CPU and a ROM. The control section 11*b* executes a program stored in the HDD 13*b* or a recording medium 25*b*. The RAM 12*b* is a work area of the control section 11*b*. The HDD 13*b* is a storage area for storing the program or data.

The DVD/CD-ROM drive 16*b* can be mounted with the recording medium 25*b*, such as a DVD-ROM or a CD-ROM. The recording medium 25*b* stores a program and data for displaying content-related information related to contents of the game program of the recording medium 25*a* mounted on the game apparatus 1. The program and data are read from the recording medium 25*b* and loaded on the RAM 12*b* by the DVD/CD-ROM drive 16*b*.

The control section 11*b* reads the program and data necessary to display content-related information from the RAM 12*b*, and processes the read program and data. The control section 11*b* processes the program and data loaded on the RAM 12*b* to output a sound output instruction to the sound processing section 14*b* and output a drawing command to the graphic processing section 15*b*. The graphic processing section 15*b* is connected to a display device 23*b*. The display device 23*b* includes a display screen 24*b*. When the control section 11*b* outputs the drawing command to the graphic processing section 15*b*, the graphic processing section 15*b* deploys an image on a frame memory 19*b*, and outputs a video signal for displaying the image on the display screen 24*b*.

An input section 21*b* and a memory card slot 20*b* are connected to the interface section 18*b*. Input information from the input section 21*b* by the player is stored in the RAM 12*b*, and the control section 11*b* performs a variety of arithmetic processing based on the input information.

The communication interface 17*b* may be connected to the communication network 3 by wireless or cable. Also, the communication interface 17*b* performs a wireless communication with the game apparatus 1 through a communication unit having an antenna 26*b*, and performs a reception of game information or the like.

Figure 4:
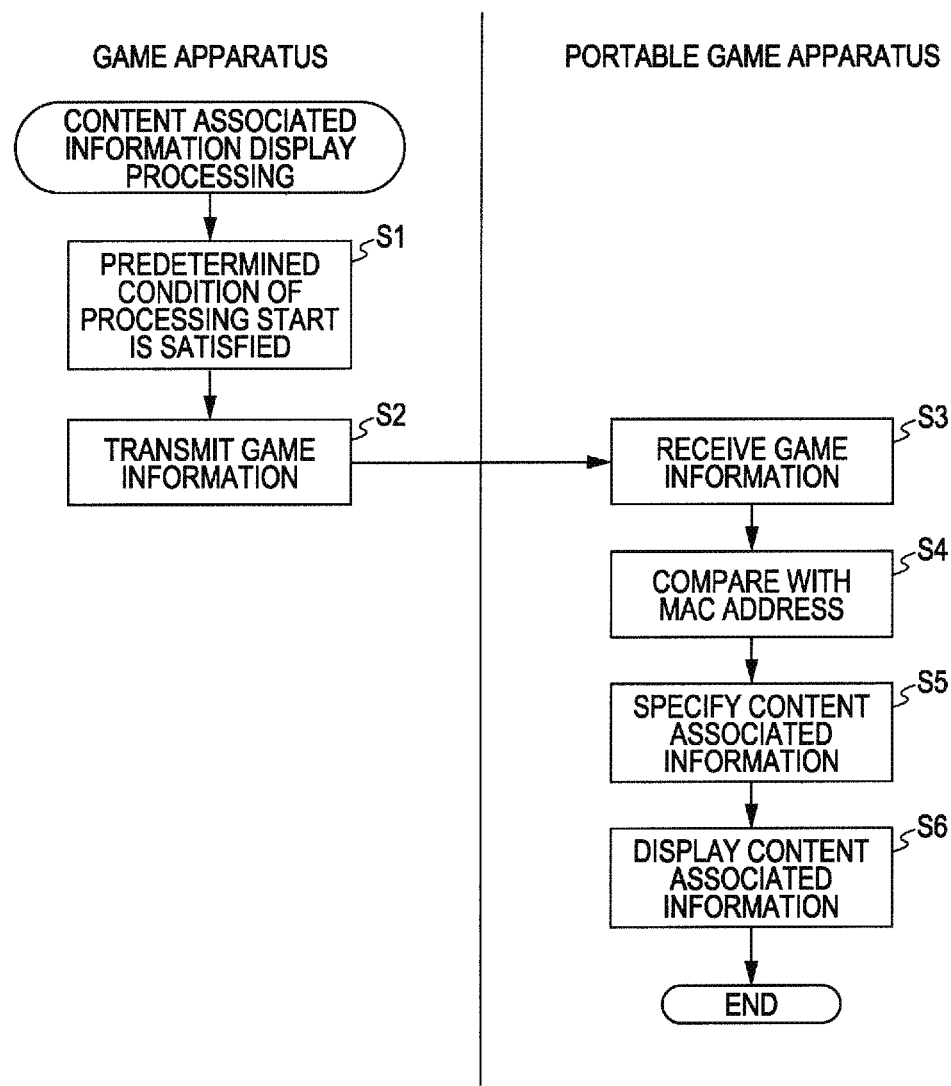
FIG. 4 is a diagram illustrating a flow chart of a content-related information display processing according to an embodiment of the present invention.

FIG. 4 is a diagram illustrating a flow chart of a content-related information display processing according to an embodiment of the present invention. First of all, in a game that is being progressed in a game apparatus 1, satisfying a predetermined condition is a trigger for starting a content-related information display processing. First, when a predetermined condition is satisfied in the game apparatus 1 in step S1, game information is transmitted to a portable game apparatus 2 according to the predetermined condition in step S2.

Here, the predetermined condition in step S1 may be appropriately set. For example, a case in which a player character and an opponent character encounter each other and start a virtual battle, a case in which a player character obtains an item, or the like may be set as the predetermined condition. In these cases, in step S2, opponent character IDs of all encountered opponent characters are transmitted to the portable game apparatus 2, or item IDs of obtained items are transmitted to the portable game apparatus 2.

Also, as described above, in addition to the case in which the content-related information display processing is automatically started together with the progress of the game, a player's operation input to the input section 21*a* may be the trigger for starting the content-related information display processing. For example, pressing a specific operation button, of which a frequency of pressing a button is relatively low during playing the game, such as pressing a select button, is the predetermined condition in step S1. In this case, information based on the game progress status when the select button is pressed is transmitted to the portable game apparatus 2. For example, when the select button is pressed in the midst of the virtual battle with the opponent character, the opponent character ID is transmitted, and, when the player character is moving through the virtual space, position coordinates in the virtual space are transmitted.

A program for displaying content-related information needs to be run on the portable game apparatus 2, and the portable game apparatus 2 needs to be in a communicable state by wireless or the like. When the portable game apparatus 2 receives game information from the game apparatus 1 in step S3, the received identification information (for example, MAC address) unique to the game apparatus 1 is compared with identification information preregistered in the portable game apparatus 2 in step S4. When different from the identification information registered in the portable game apparatus 2, a subsequent processing is not performed.

When the identification information received from the game apparatus 1 is matched with the identification information registered in the portable game apparatus 2, content-related information to be displayed on the display screen 24b of the portable game apparatus 2 is specified according to the received information in step S5. When the content-related information is specified, the content-related information is displayed on the display screen 24b of the portable game apparatus 2 in step S6. Whenever the predetermined condition for starting the content-related information display processing is satisfied, a series of processing from step S1 to step S6 is repetitively performed until the game is finished.

Specifying the content-related information in step S5 is performed by referring to, for example, a content-related information table preset in a storage area of the portable game apparatus 2. FIGS. 5a to 5c are diagrams illustrating examples of a content-related information table according to an embodiment of the present invention.

FIG. 5a is a content-related information table 30 related to opponent characters, which is used when an opponent character ID 31 is received. The content-related information table 30 stores, in association with the opponent character ID 31, information on an opponent character name 32, a maximum HP 33 (maximum value of a physical strength of the opponent character), a maximum MP 34 (maximum value of a magic power usable by the opponent character), an offensive power 35, a defensive power 36, a special ability 37 (special ability to cast a flame or blizzard to cause a damage to all ally characters or to paralyze attacked characters), a character design ID 38 of the opponent character, or the like.

In case that the opponent character is a boss character as described later, a weakness or feature of the boss character, or a description about a battle policy for winning the battle more easily may be further stored in the content-related information table 30. In step S5, the information corresponding to the received opponent character ID 31, that is, the opponent character name 32 to the character design ID 38 and the like, is specified as the content-related information, and the respective relevant information is displayed on the display screen 24b of the portable game apparatus 2.

Also, among the opponent characters, in the case of not the opponent character randomly encountered during a field movement but a boss character encountered when a predetermined event occurs or when a player character arrives at a predetermined position within a virtual space, hint information in progressing a virtual battle, such as a strategy for a battle with the boss character, as well as information on a status or special ability of the boss character, an obtainable item, or the like, may also be displayed on the portable game apparatus 2.

For example, when a plurality of player characters form a party and encounter with the boss character, information on the player characters belonging to the party, together with the boss character ID, is transmitted from the game apparatus 1 to the portable game apparatus 2. Here, the information on the player characters, including information on an occupation predefined to each player character or a strength level of the occupation, is transmitted. For example, when four player characters exist in the party, information like "warrior Lv15," "knight Lv14," "white magician Lv15," or "black magician Lv15" is transmitted.

As for the method for attacking the boss character displayed on the portable game apparatus 2, which attacking method is to be displayed in advance according to a combination of occupations is set to the content-related information table. For example, when five occupations exist and four player characters belong to the party, a description of 625 5×5×5×5) attacking methods may be previously prepared in the content-related information table.

Also, in regard to the occupations of the player characters, the warrior, the knight, and the like may be classified as an "attack based occupation," the white magician may be classified as a "recovery magic based occupation," and the black magician may be classified as an "attack magic based occupation." A description about attacking methods for each occupation classification combination of the "attack based occupation," the "recovery magic based occupation," and the "attack magic based occupation" may be previously prepared in the content-related information table. In this case, the effect method of the boss character displayed on the portable game apparatus 2 is specified according to the occupation classification combination of the player characters belonging to the party. For example, a party of two attack based characters and two recovery magic based characters, and a party of two attack based characters, one recovery magic basic character and one attack magic based character are different in the attacking method displayed on the game terminal 2.

Also, as the method for attacking the boss character, when an indication such as "if necessary, let's use a cure, a recovery magic, for an ally" is made on the portable game apparatus 2, the indication "cure" may also be automatically changed to an indication "cura (recovery magic stronger than the cure) according to a level of a white magician who can use the recovery magic.

As described above, according to the status of the player character, different content-related information is specified and different contents are displayed on the portable game apparatus 2. Therefore, information suitable for the status of the player character may be provided to further improve convenience.

Also, in case that the player character can obtain items or virtual currency owned by the opponent character when the player character defeats the encountered opponent character in the virtual battle, information on the items or an obtainable amount of the virtual currency is displayed on the portable game apparatus 2. As the information on the items, for example, an obtainable probability or the like, as well as names or effects of the items, may be displayed.

FIG. 5b is a content-related information table 40 related to items, which is used when an item ID 41 is received in the portable game apparatus 2. The content-related information table 40 stores, in association with the item ID 41, information on an item name 42, an item type 43, an item effect 44, an item design ID 45, or the like. In step S5, the information corresponding to the received item ID 41, that is, the item name 42 to the item design ID 45 and the like, is specified as the content-related information, and the respective relevant information is displayed on the display screen 24b of the portable game apparatus 2.

Also, in case that the progress of the game is paused according to the player's operation to the input section 21a and a menu screen is opened to display the type or number of defeated opponent characters, a cleared mission or quest, or a play history such as a wining rate or the like in a virtual battle, further detailed information may be displayed on the portable game apparatus 2. In this way, detailed play history (for example, opponent characters the player character has encountered so far, or display design of the obtained items, and pictorial book about a detailed description thereof), which could not have been displayed on the display screen 24a alone of the game apparatus 1 due to a large amount of information, can be checked on the display screen 24b.

In this case, when the player operates the input section 21a to open the menu screen, information on the play history (information on the type or number of the encountered opponents, the type or number of the obtained items, or the like) is transmitted from the game apparatus 1 to the portable game apparatus 2, and an image to be displayed on the display screen 24b is specified in the portable game apparatus 2 according to the received history information. For example, in regard to the opponent character the player character encounters in the game apparatus 1, the character design is also displayed on the portable game apparatus 2. However, in regard to the opponent character the player character has not yet encountered, the character design is not displayed.

Besides that, when a specific event, such as a quest, which is given to the player character as a task, occurs in the game apparatus 1, the portable game apparatus 2 may display a secret story related to the event or a relevant episode. FIG. 5c is a content-related information table 50 related to a quest, which is used when a quest ID 51 is received in the portable game apparatus 2. The content-related information table 50 stores therein, in association with the quest ID 51, information on a quest name 52, a clear condition 53, a quest related story descriptive text ID 54, or the like. In step S5, the information corresponding to the received quest ID 51, that is, the quest name 52 to the related story descriptive text ID 54 and the like, is specified as the content-related information, and the respective relevant information is displayed on the display screen 24b of the portable game apparatus 2.

Figure 6:
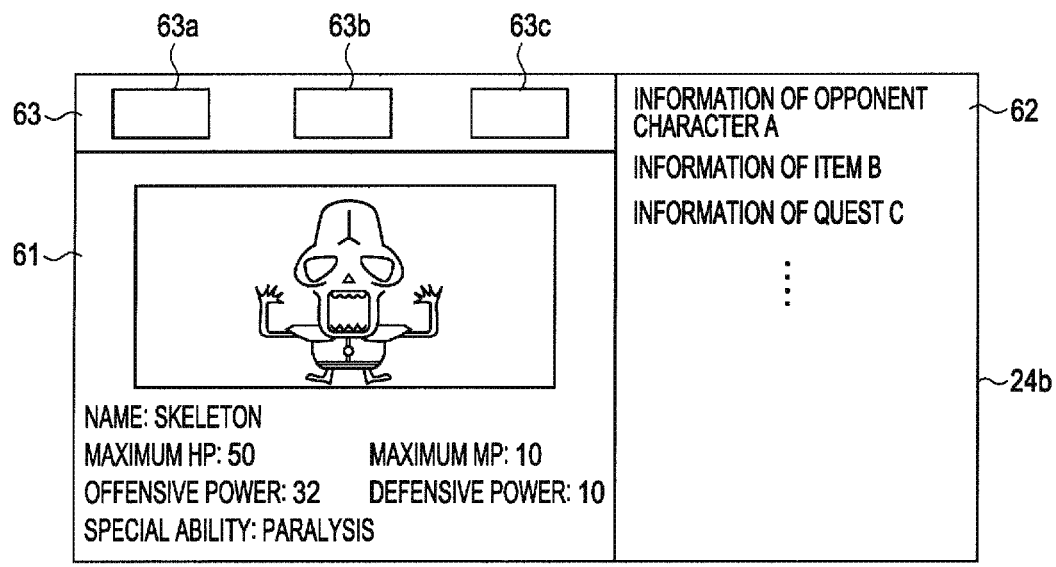
FIG. 6 is a diagram illustrating an example of a display screen of a portable game apparatus according to an embodiment of the present invention.

FIG. 6 is a diagram illustrating an example of the display screen of the portable game apparatus according to the embodiment of the present invention. The display screen 24b includes a main information display area 61, a sub information display area 62, and an advertisement area 63. In the main information display area 61, detailed information of the encountered opponent character, the obtained item, the generated event, or the like is displayed according to the game information transmitted from the game apparatus 1. For example, in the case of receiving the opponent character ID and displaying the detailed information of the corresponding opponent character, the information corresponding to the opponent character name 32 to the character design ID 38 of the content-related information table 30 of FIG. 5a is displayed in the main information display area 61 as illustrated in FIG. 6.

When the portable game apparatus 2 newly receives game information after the content-related information is displayed in the main information display area 61 of the portable game apparatus 2, contents displayed in the main information display area 61 is switched to content-related information corresponding to the newly received information. The information displayed in the main information display area 61 in the past is stored in the RAM 12b as history information. In the sub information display area 62, only the items of the content-related information displayed in the main information display area 61 in the past are displayed like, for example, "information of the opponent character A" and "information of the item B." The player can operate the input section 21b of the portable game apparatus 2 to select items displayed in the sub information display area 62. When these items are selected, the content-related information corresponding to the selected items is displayed in the main information display area 61 again.

Also, the player can operate the input section 21b of the portable game apparatus 2 to fix the content-related information displayed in the main information display area 61 to the display screen 24b, without switching to other information. In the RAM 12b, a main information management table is stored, and a fixing flag may be set by the player's operation to the input section 21b. When the fixing flag is set, the content-related information displayed in the main information display area 61 is fixed to the display screen 24b. Furthermore, until the setting of the fixing flag is released by the operation to the input section 21b, the content-related information displayed in the main information display area 61 is not switched, even though the portable game apparatus 2 receives information on a new game progress status.

As illustrated in FIG. 6, various advertisements 63a to 63c are displayed in the advertisement display area 63. Contents of the advertisements may be linked with the contents of the content-related information displayed in the main information display area 61. For example, an advertisement for a character product of an opponent character displayed in the content display area 61 is displayed in the advertisement display area 63.

Figure 7:
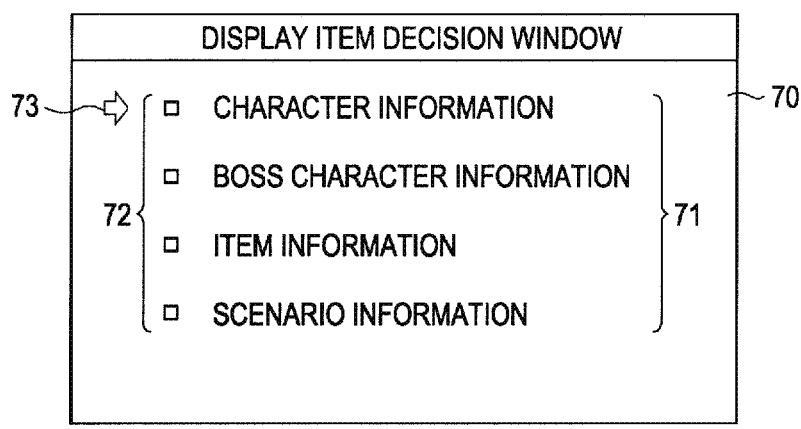
FIG. 7 is a diagram illustrating a display item decision window according to an embodiment of the present invention.

Also, the player can preselect information to be displayed in the portable game apparatus 2. FIG. 7 is a diagram illustrating a display item decision window according to an embodiment of the present invention. As illustrated in FIG. 7, the display item decision window 70 is provided with a list of items 71 displayable in the portable game apparatus 2 and check boxes 72 for checking whether or not the display of each item is wanted. The player operates the input section 21b to move a cursor 73 up and down and press an operation button to check or uncheck the check boxes 72. When checked, information on the item is displayed. When unchecked, information on the item is not displayed.

In this way, it is possible to respond to various requests, such as a case of wanting information on only an opponent character, a case of wanting information on only items, or a case of wanting information on a general opponent character but not wanting information on a boss character. In this case, the information displayed is limited by not performing the transmission of the game information to the portable game apparatus 2 in step S2 of FIG. 4, specifying the content-related information in step S5, not performing the display in step S6, or the like. Also, the setting by the display item decision window 70 may be set to any of the game apparatus 1 and the portable game apparatus 2.

In the above embodiments, the case in which the invention is applied to the video game has been described, but content-related information can also be displayed in the content-related information display device having a display screen of a portable terminal or the like when a user views contents, such as a movie, a music, an audio, an animation, an electronic book, or an electronic comic, or the like on a content reproduce apparatus (for example, a CD player, a DVD player, a radio, a television or personal computer, or the like). Herein, the content reproduce apparatus is not specially limited to the above-described specific examples as long as contents, such as a movie, a music, an audio, an animation, an electronic book, an electronic comic, or the like can be reproduced.

For example, when a movie is being reproduced in a DVD player, as content-related information, the DVD player can display profile information such as a name or age of an actor or actress appearing in the movie, movies the actor or actress has done till now, a career of the actor or actress, or the like, item information such as a cloth, an accessory, a bag, or the like the actor or actress wears, in the portable phone or the like. The DVD stores content IDs, as well as contents such as a movie or the like, in association with a play time. When a play time in the DVD player comes at a predetermined time, a content ID is transmitted from the DVD player to a portable terminal a user owns by communication. As a result, display profile information or item information corresponding to the content ID is displayed on the display screen of the portable terminal.

Also, the invention can be applied to the case of reproducing the movie in a theater, as well as the case of reproducing a movie in the DVD player. In this case, when the movie is shown in the theater, an e-mail attached with a predetermined URL is sent to a preregistered e-mail address at a predetermined screen time. The e-mail is sent by a communication device attached to a film projector. By accessing the predetermined URL received by the portable terminal, the user can browse profile information or item information through a browser. Also, a cloth, an accessory, a bag, or the like displayed on the portable terminal can be purchased by making payment on the terminal.

Also, for example, when an audio of a language lesson such as English or French is reproduced in the CD player, as content-related information, contents such as a text of the language lesson or further detailed description of words or phrases appearing in the language lesson can be displayed on a portable terminal such as a portable phone or the like.

As described above, in the case of reproducing a CD or a DVD, contents displayed on the portable terminal can be changed according to a play time predefined at each track. In the CD or DVD, the content ID is prestored in association with a track number and a play time. A trigger occurs when a predetermined play time has elapsed, and the content ID corresponding to the play time and unique numbers assigned to these CD or DVD reproduce apparatuses are transmitted to the portable terminal. In the portable terminal, a unique number of a specific reproduce apparatus is preregistered. A verification to determine whether the received number is identical to the registered number is performed in the portable terminal. As a result, when these numbers are identical to each other, information corresponding to the content ID is displayed on the display screen of the portable terminal. Also, in the portable terminal, it is necessary to previously download application software for displaying related information for each CD or DVD. In the portable terminal, the content ID and the information displayed on the display screen are stored in association with each other, and display information is specified based on the received content ID.

For example, when a reproduction of a track number 1 is started, a predetermined content ID is transmitted to the portable terminal, and the same contents as page 3 of a text of a language lesson, which is commercially available in a paper medium, are displayed on the display screen of the portable terminal. When the contents of audio reproduced after 5 minutes have elapsed from the reproduction start of the track number 1 correspond to page 4 of the text of the language lesson, a different content ID from that previously transmitted from the reproduce apparatus is transmitted to the portable terminal again. As a result, the same contents as page 4 of the text of the language lesson are displayed on the display screen of the portable terminal.

Also, although the content-related information displayed on the portable terminal can be specified by transmitting the content ID from the reproduce apparatus, content-related information displayed based on the received information may be specified in the portable terminal by transmitting information specifying a CD or DVD title, a track number, and a play time from the reproduce apparatus to the portable terminal. In this case, the portable terminal downloads the application software to prestore therein the track number, the play time, and the displayed content-related information in association with one another.

If applying these, for example, text contents, items related to the contents of the video being reproduced, or a model answer of a test can also be displayed on portable terminals children have on their hands, while showing an educational video to children on a television monitor or a screen in a school, a private preparatory school, or the like. This can also be applied in a lecture meeting or a presentation place. Further detailed relevant document or data can also be displayed on the portable terminal an audience has on her or his hands, while viewing a video related to a presentation on a large screen.

Also, during the broadcast of a television or a cable television, information related to broadcast contents can also be displayed on portable terminals owned by viewers. Information specifying the related information displayed on the portable terminal is included in radio waves transmitted from each television station in order to broadcast TV programs, and is transmitted from the television, which is the content reproducer apparatus, to the portable terminal. More specifically, for example, an URL or the like of a site related to contents of a program being broadcast is transmitted to the portable terminal. When the viewer accesses the URL, cost information can be displayed on the portable terminal.

For example, in the case of introducing a shop, an inn, or a hotel within a program, a map or a contact number indicating the place is displayed on the portable terminal. In the case of introducing a person, a profile of the person is displayed. Alternatively, in association with a CM broadcast between TV programs, more detailed information on a product introduced in the CM (description about an available place or function of the product, or the like) is displayed on the portable terminal.

Besides that, when the user downloads an electronic comic in a personal computer by using the Internet and browses, advertisement or information related to the contents of the electronic comic may be displayed on a portable terminal owned by the user according to a reproduction status of the electronic comic. In this case, contents to be displayed on the portable phone are specified based on a title of the electronic comic and a frame being reproduced.

Also, when the user browses videos in a video posting site on a personal computer by using the Internet, advertisement or information related to the contents of the video may be displayed on a portable terminal owned by the user according to a reproduction status of the video. In this case, information that can specify the displayed advertisement can be transmitted to the portable terminal via a server in which the video posting site is uploaded, and can also be directly transmitted from the personal computer browsing the videos.

What is claimed is:

1. A content-related information display system, comprising:
   a first apparatus including:
      a first memory that stores content;
      a first processor that outputs a drawing command for displaying the content on a first display, and generates progress status information which is related to a progress status of the content;
      the first display that displays the content; and
      a first interface that transmits the progress status information; and
   a second apparatus including:
      a second interface that receives the progress status information transmitted by the first interface of the first apparatus;
      a second memory that stores content-related information which is related to the content;
      a second processor that specifies the content-related information which is configured to be displayed on a second display according to the progress status information received by the second interface and generated by the first processor; and
      the second display that displays the content-related information according to a player input being received by the second processor,
   wherein the content-related information is preset in the second memory, and
   the first processor generates the progress status information in response to at least one of a predetermined condition being satisfied in relation to the progress status of the content or a specific operation being received by the first processor.

2. The content-related information display system according to claim 1,
   wherein the second apparatus is connectable to the first apparatus by one of a communication line and a communication network, and
   the first interface of the first apparatus transmits the progress status information to the second interface of the second apparatus via the one of the communication line and the communication network.

3. The content-related information display system according to claim 2, wherein the first apparatus is a video game apparatus, and the content is a video game program.

4. The content-related information display system according to claim 2, wherein the second apparatus is a portable video game apparatus terminal.

5. The content-related information display system according to claim 1, wherein the content-related information which is configured to be displayed on the second display includes information related to an event configured to occur in the content.

6. The content-related information display system according to claim 1, wherein the content-related information includes information which is not displayed on the first display.

7. The content-related information display system according to claim 1, wherein the content-related information which is configured to be displayed on the second display includes a detailed map of a virtual space related to the content.

8. The content-related information display system according to claim 7,
   wherein the content is a video game program, and
   the detailed map of the virtual space relates to an area in which a player character of the video game program moves.

9. The content-related information display system according to claim 1, wherein the content-related information which is configured to be displayed on the second display includes a status or an ability of a character in the content.

10. The content-related information display system according to claim 9,
    wherein the content is a video game program, and
    the status or the ability of the character relates to an opponent character in the video game program.

11. The content-related information display system according to claim 9,
    wherein the content is a video game program progressed by a player, and
    the status or the ability of the character relates to an opponent character which a player character encounters in the video game program, the player character being controlled by the player.

12. The content-related information display system according to claim 1, wherein the progress status information that is generated by the first processor includes position coordinates relating to the progress status of the content.

13. The content-related information display system according to claim 12,
    wherein the content is a video game program progressed by a player in a virtual space, and
    the position coordinates correspond to a position of a player character in the virtual space, the player character being controlled by the player.

14. The content-related information display system according to claim 1, wherein, when the progress status of the content includes a menu screen being opened, the second processor specifies detailed information corresponding to the menu screen as the content-related information which is configured to be displayed on the second display.

15. The content-related information display system according to claim 1, wherein the second processor specifies the content-related information which is configured to be displayed on the second display when the progress status of the content is paused.

16. The content-related information display system according to claim 1,
    wherein the content-related information stored in the second memory includes registration information unique to the first apparatus,
    the progress status information generated by the first processor includes identification information, and
    the second processor specifies the content-related information which is configured to be displayed on the second display when the identification information matches the registration information.

17. A method for displaying content on a first display of a first apparatus, content-related information related to the content displayed on the first display configured to be displayed on a second display of a second apparatus, the method comprising:
    reading, with a first processor of the first apparatus, the content from a first memory of the first apparatus for displaying the content on the first display;
    displaying, with the first display, the content;
    generating, with the first processor, progress status information which is related to a progress status of the content; and transmitting, with a first interface of the first apparatus, the progress status information to a second interface of the second apparatus, wherein the second interface of the second apparatus is configured to receive the progress status information transmitted by the first interface, a second processor of the second apparatus is configured to specify, from a second memory of the second apparatus, the content-related information which is configured to be displayed on the second display according to the progress status information received by the second interface, the second display is configured to display the content-related information according to a player input being received by the second processor, the content-related information is configured to be preset in the second memory, and the progress status information is generated with the first processor in response to at least one of a predetermined condition being satisfied in relation to the progress status of the content or a specific operation being received by the first processor.

18. A non-transitory computer-readable recording medium having recorded thereon a program which is executed by a first apparatus, and which causes the first apparatus to serve as:

a first memory that stores content;

a first processor that outputs a drawing command for displaying the content on a first display, and generates progress status information which is related to a progress status of the content;

the first display that displays the content; and a first interface that transmits the progress status information to a second interface of a second apparatus, wherein the progress status information is received by the second interface of the second apparatus for displaying content-related information on a second display of the second apparatus, according to the progress status information received by the second interface and generated by the first processor, the content-related information is configured to be preset in a second memory of the second apparatus, and the first processor generates the progress status information in response to at least one of a predetermined condition being satisfied in relation to the progress status of the content or a specific operation being received by the first processor.

* * * * *